May 5, 1936.  A. D. SNYDER ET AL  2,040,030
MATERIAL FUSING AND PROJECTING APPARATUS
Filed March 24, 1932  7 Sheets-Sheet 2
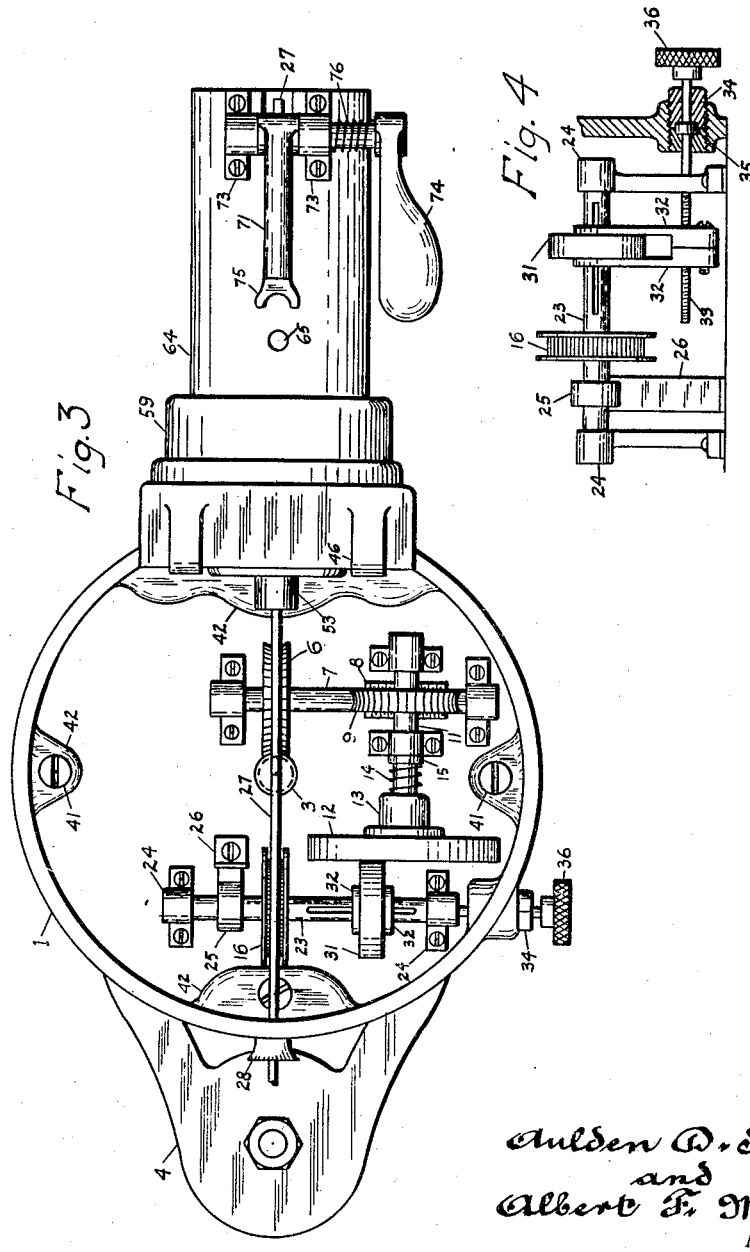
Alden D. Snyder
and
Albert F. Maier,
INVENTORS
BY
William J. Wesseler,
ATTORNEY.

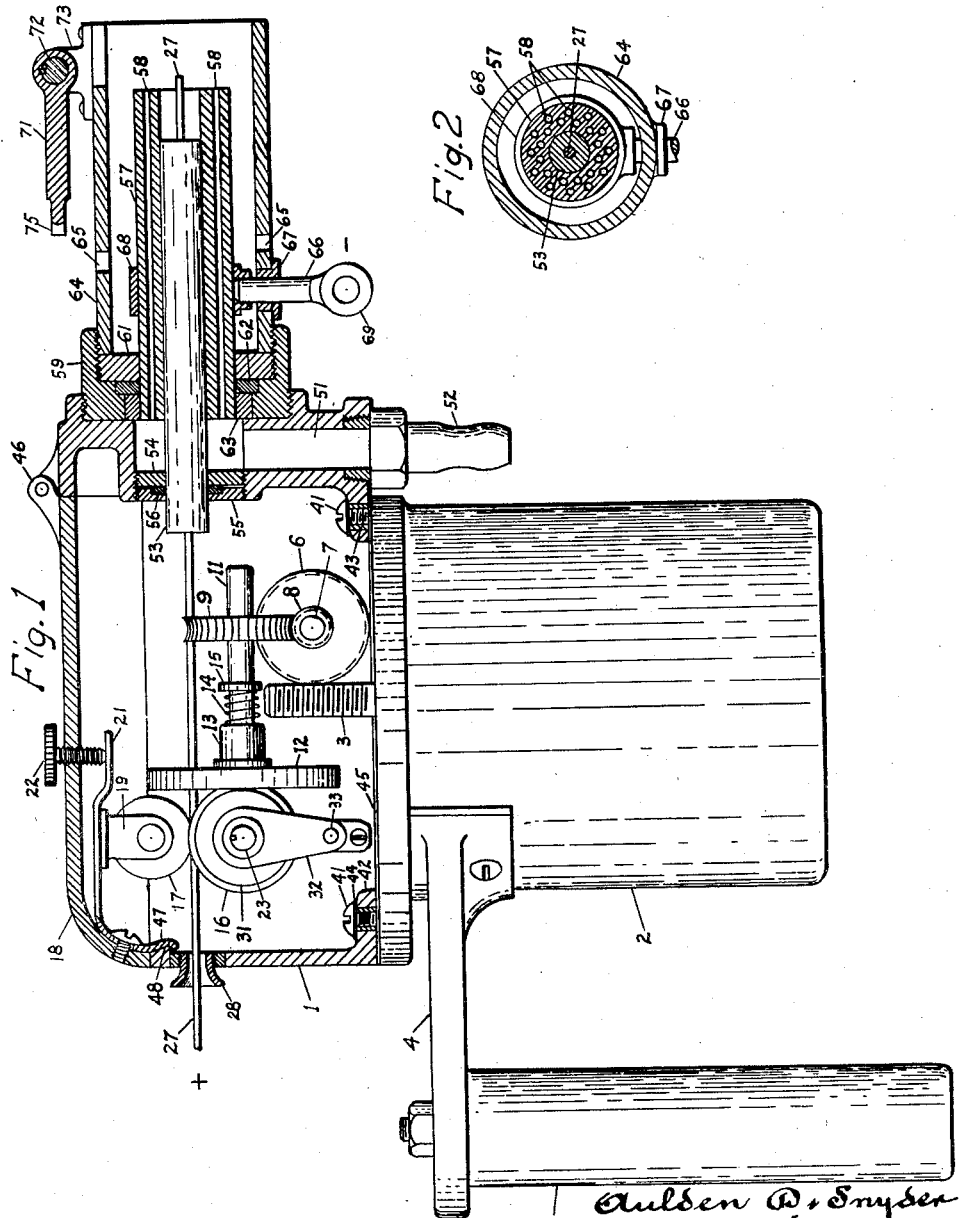

May 5, 1936. A. D. SNYDER ET AL 2,040,030
MATERIAL FUSING AND PROJECTING APPARATUS
Filed March 24, 1932 7 Sheets-Sheet 3
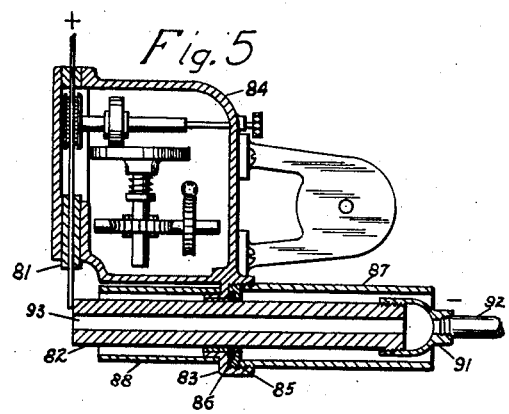
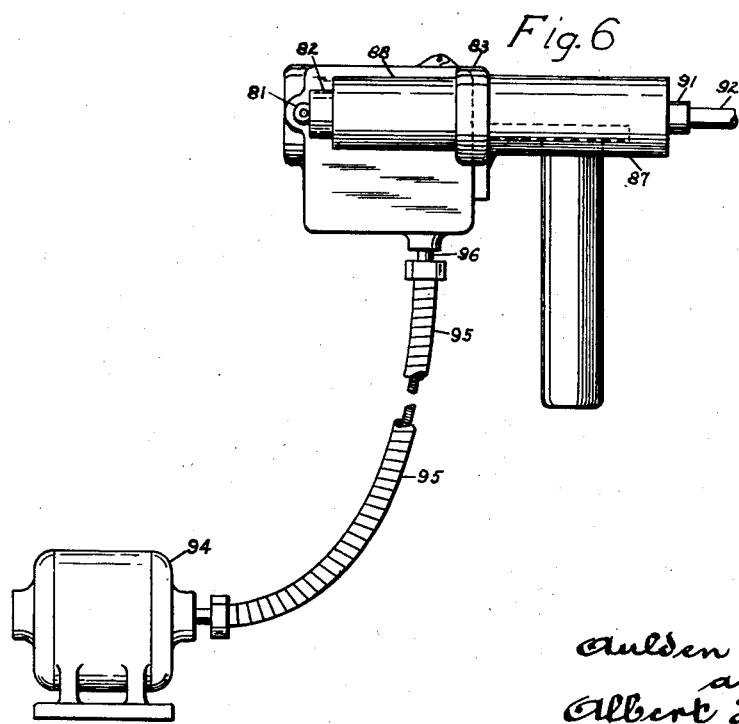
Aulden D. Snyder
and
Albert F. Maier,
INVENTORS
BY William J. Wesseler
ATTORNEY.

May 5, 1936.  A. D. SNYDER ET AL  2,040,030
MATERIAL FUSING AND PROJECTING APPARATUS
Filed March 24, 1932  7 Sheets-Sheet 4
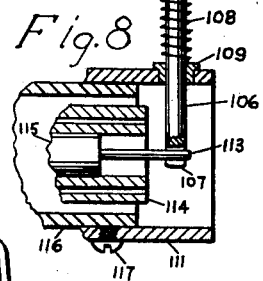
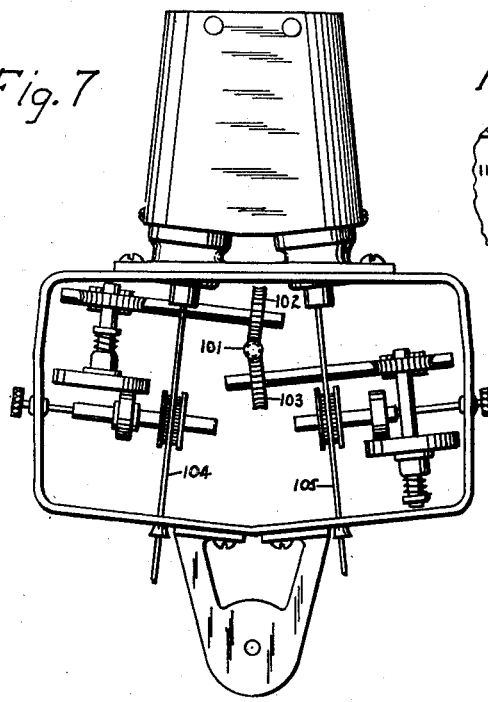
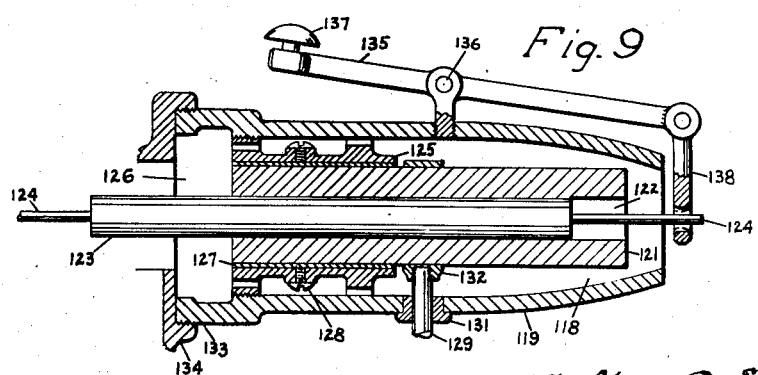
Alden D. Snyder
and
Albert F. Maier,
INVENTORS
BY
William J. Wesseler,
ATTORNEY.

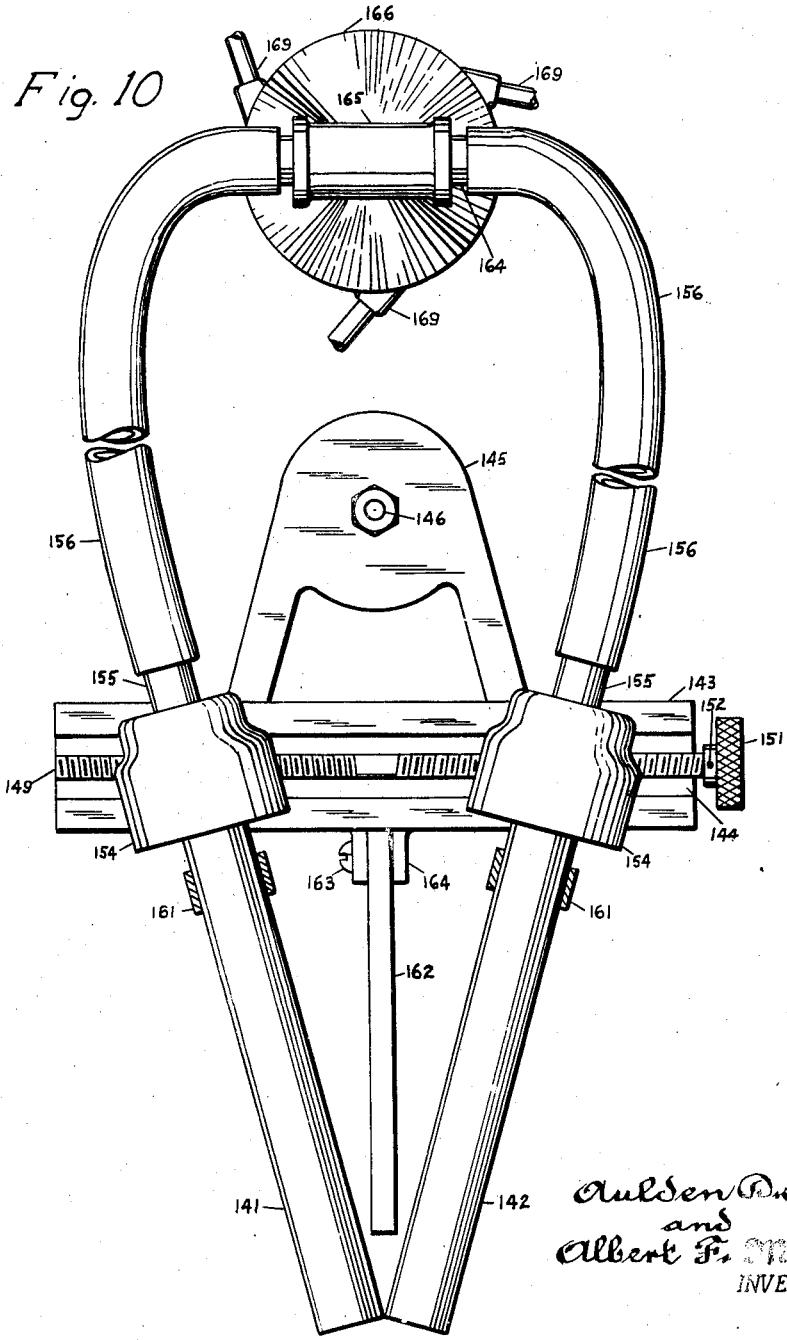

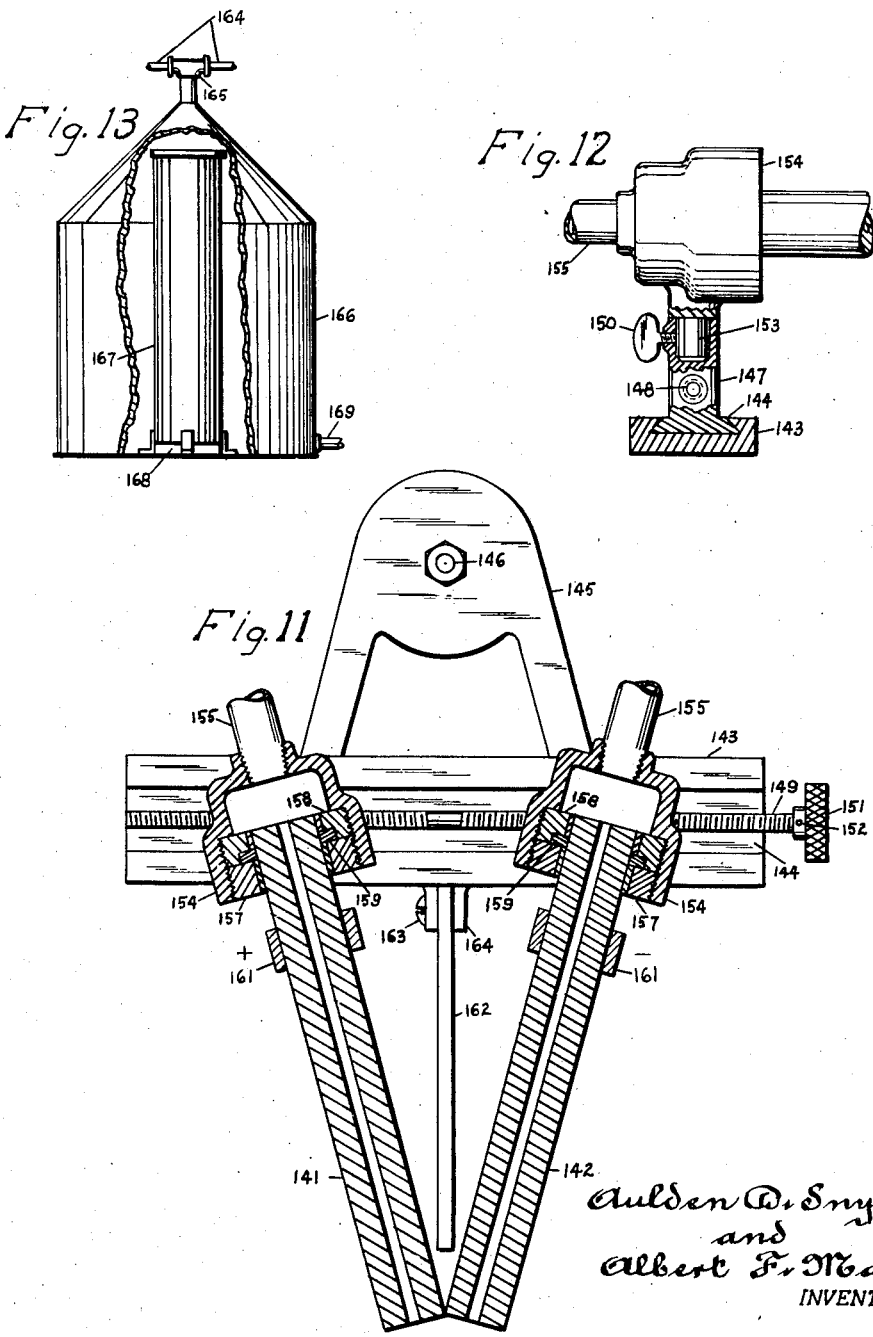

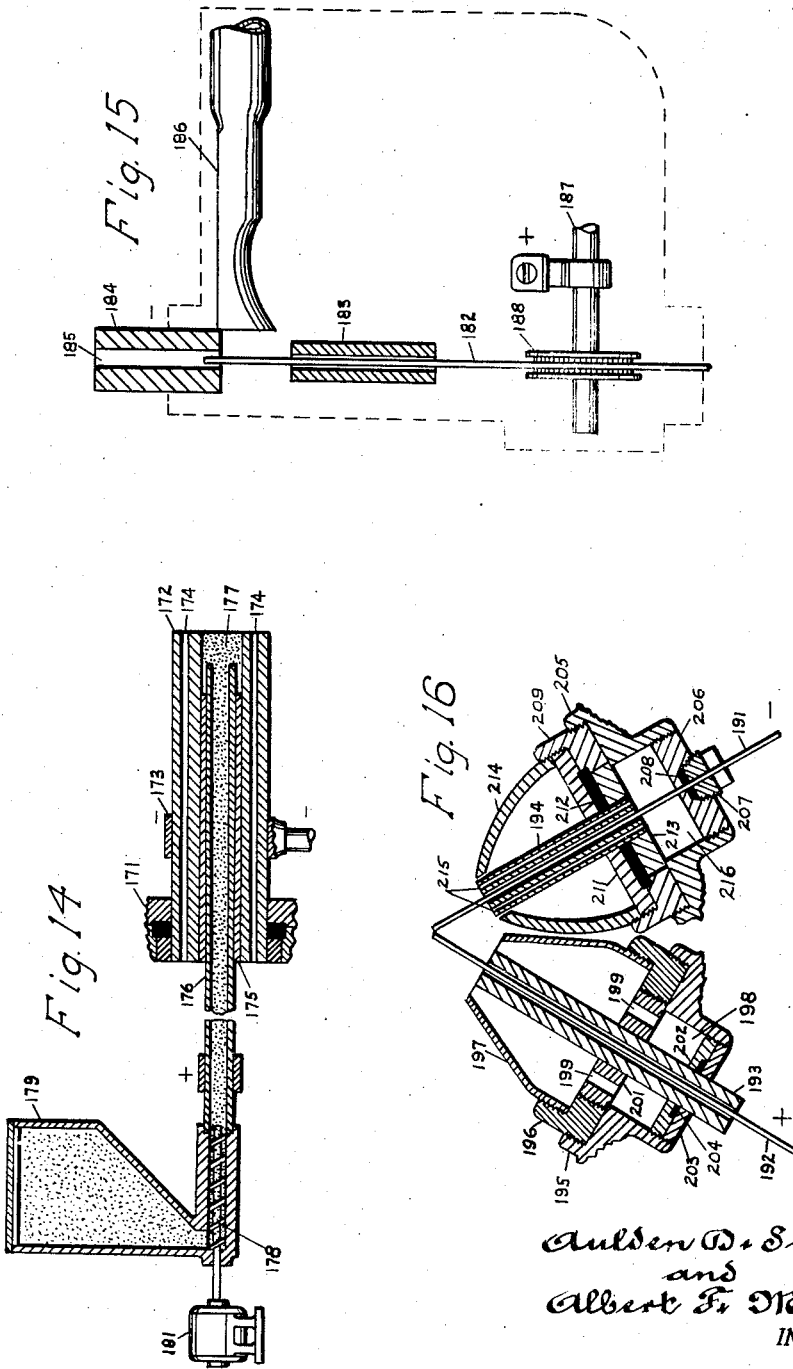

Patented May 5, 1936

2,040,030

UNITED STATES PATENT OFFICE 2,040,030

MATERIAL FUSING AND PROJECTING APPARATUS

Aulden D. Snyder, Cleveland, and Albert F. Maier, Cleveland Heights, Ohio

Application March 24, 1932, Serial No. 600,952

2 Claims. (Cl. 83—91)

This invention, as indicated, relates to a material fusing and projecting apparatus. More particularly, it comprises an apparatus having special means for feeding material to be fused to the point of fusing and projecting the same toward a surface to be coated, and is designed preferably as an apparatus wherein an electric arc is used as the heating means for the material supply to be fused and a current of air or other gas under pressure is supplied in such relation to such arc as not to interfere with the same, yet in a position to carry the particles fused by the action of said arc into contact with the surface to be coated. This relation of the gas jet to the path of the arc will be referred to herein as being externally tangential to the positive column of the arc.

Heretofore, material spraying apparatus has been known and such apparatus has included an electric arc as a means for fusing the wire or pulverized material supplied thereto. However, in all such instances no positioning of the jet of air has been provided for, which would not seriously interfere with the regularity of the arc and affect the even distribution of the fused material over the surface to be coated.

The principal object of the present invention is to provide an improved material spraying apparatus wherein a high degree of heat may be developed and wherein the material to be fused is supplied to the heating area and means is provided for projecting the fused material toward the surface to be coated in such manner as not to disturb the regularity and evenness of the electric arc used as the heating means and to maintain as substantially constant as possible a projection of fused material toward the surface to be coated.

Another object of the invention is to provide means to entrain and project fused particles and assist in breaking them up into finely divided elements and depositing them in intimate association with the particles on the surface to be coated without interfering with the uniformity of the arc and the even supplying of the material to be fused.

Another object of the invention is to provide a hollow electrode for a spraying apparatus.

Another object of the invention is to provide an electrode having a plurality of passageways extending longitudinally thereof.

Another object of the invention is to provide a spray apparatus adapted to use pulverized material to be fused and means for projecting the same into an arc and thence the fused material against the surface to be coated.

Another object of the invention is to provide an electrode in the form of a wire to be fused and a second electrode in the form of a hollow carbon surrounding the first electrode with proper insulation thereinbetween, whereby the thickness of the insulating medium would determine the minimum spacing of the electrodes.

Another object of the invention is to provide an arc of the character just described having around its periphery a pressure jet adapted to produce an area of reduced pressure adjacent said arc, whereby to induce the fused particles to enter such current and be projected onto a surface.

Another object of the invention is to provide a latitude of control for the feeding means for the wire electrode so that a change of material may be readily provided and change of speed in feeding the same.

Another object of the invention is to provide improved means for setting up the arc which means may be removed to a position free of the jet.

Another object of the invention is to provide a light, compact spraying apparatus which may be readily handled by the operator and may be adjusted for speed of the material supply and the quantity of heat at the fusing point.

Another object of the invention is to provide an apparatus wherein the motor drive for the material supply is independently supported and carried to the point of application of power through a flexible drive shaft.

Another object of the invention is to provide a pair of independent material fusing nozzles fed by drive mechanism preferably actuated by a single prime mover and adapted to supply fused material from a plurality of material supplies of the same or varying character which may be intermixed, if desired, at the meeting point of the respective jets.

Another object of the invention is to provide a plurality of nozzles parallelly arranged or angularly related to each other.

Another object of the invention is to provide spraying apparatus with magnetic means for displacing the arc toward a predetermined position.

Another object of the invention is to provide a method of applying to material to be fused a degree of heat of sufficient intensity to impart to the fused material a state of free molecular activity.

Other and further objects of the invention will appear in the course of the following description.

To the accomplishment of the foregoing and related ends, said invention, then, consists of the means and method hereinafter fully described and particularly pointed out in the claims, the annexed drawings and the following description setting forth in detail certain mechanism and steps embodying the invention, such disclosed means constituting, however, but several of various mechanical forms in which the principle of the invention may be used.

In said annexed drawings:

Figure 1 is a side elevation partly in section showing one form of apparatus embodying the principles of the invention;

Figure 2 is a transverse vertical sectional view through a portion of the nozzle shown in Figure 1;

Figure 3 is a top plan view of the apparatus shown in Figure 1 with the cover section thereof removed;

Figure 4 is a detail view in the form of an end elevation partly in section of a portion of the drive mechanism for the fusing wire supply;

Figure 5 is a sectional view showing a modified form of apparatus wherein the wire to be fused comprising one electrode is fed at an angle to the air jet member embodying another electrode;

Figure 6 is a side elevation of an apparatus wherein the motor drive to the wire feeding apparatus is carried through a flexible shaft from the fixed position of the motor at an adjacent point;

Figure 7 is a top plan view of an apparatus with the cover section removed illustrating a multiple nozzle with wire feeding means actuated from a single power source and independently adjustable as to each wire;

Figure 8 is an enlarged detail view partly in section illustrating a modified form of arc-initiating device;

Figure 9 is a central longitudinal sectional view of a modified form of apparatus wherein a nozzle shell is provided adapted to concentrate the pressure jet around the fusing point of the material;

Figure 10 is a top plan view, partly in section, showing an apparatus for projecting pulverized material;

Figure 11 is a view, partly in section, showing details of the construction of the adjustable electrodes illustrated in Figure 10;

Figure 12 is an enlarged detail view, partly in section, showing an adjustable pivot for one of the nozzles illustrated in Figures 10 and 11;

Figure 13 is a side elevation partly in section of the reservoir for pulverized material shown in Figure 10;

Figure 14 is a view largely in section showing a modified form of apparatus for spraying pulverized material;

Figure 15 is a view, partly in section, showing another modified form of spray gun construction; and Figure 16 is a view of a double nozzle spray apparatus, said nozzles having individual features of construction.

As is clearly shown in Figures 1 and 3, the preferred form of apparatus comprises a casing 1 within which the wire feeding mechanism is mounted, said casing being secured to the end plate of a motor housing 2 having a worm shaft 3 extending upwardly at a central point.

A side bracket 4 is secured to the motor housing and a handle 5 is secured to the outer end of said bracket whereby the apparatus may be carried by the operator when in use. At the forward end of the wire feeding casing the nozzle section of the apparatus is provided.

The motor shown in this apparatus comprises an electric motor, although where desired an air motor in the form of a Pelton wheel or the like may be used. The shaft 3 of the electric motor engages a worm wheel 6 operating a transverse shaft 7 carrying a worm 8 and in turn driving a worm wheel 9 on a transverse shaft 11 carrying a resiliently supported friction disc 12 at the end thereof. Said disc preferably is formed with a hub 13 at its rearward end splined to the shaft and held at its outward limit of motion by a coil spring 14 about the shaft bearing against a fixed collar 15 at a central point on the shaft. The means for feeding the wire comprises a feeding wheel 16 with minute teeth between two flanges of a size to guide the wire and prevent lateral displacement and to receive within the same an idler wheel 17 carried on a hinge cover 18 at the top of the casing. Said idler wheel is mounted on a bracket 19 carried on a spring member 21 and an adjusting screw 22 with a knurled head is mounted adjacent the free end of the spring to apply any desired degree of pressure to cause said wire to engage the toothed portion of the driving wheel. The feeding wheel 16 is mounted on a shaft 23 supported at its ends in bracket members 24 secured to the base of the casing and has adjacent thereto a current conducting wheel 25 adapted to be energized by sliding contact with a spring terminal member 26 to carry one portion of the electric circuit to the wire 27. The wire is received through an aperture in the rearward end of the casing suitably insulated from the casing and the brackets and other mechanism of the drive are also suitably insulated from the casing. A funnel-shaped sleeve 28 is engaged in the aperture through which the wire enters the casing to assist in guiding the same to the feeding position.

The means for transferring power from the driving disc 12 to the feeding wheel 16 for the wire comprises a non-conducting friction wheel 31 splined upon the feed wheel shaft 23 and adapted to be shifted transversely across the face of the driving disc by means of a shifting yoke 32 formed in two parts and engaged upon opposite sides of said friction wheel and adapted to be moved transversely of the driving disc by means of an adjusting screw 33 rotatably secured in a block 34 adjacent the lower end of the casing through engagement of a collar 35 on said screw shaft within a recess in the supporting block mounted in the casing wall, wherein an enlargement is provided to receive the same. The outer end of the screw shaft is provided with a knurled head 36 and provides for minute transverse adjustment of the friction wheel so that substantially any desired speed of wire feed can be provided for, without altering the speed of the prime mover.

The gear ratios used in the wire feeding mechanism, both in the reduction gears provided by the worms and worm wheels, and in the size of the friction disc 31 with reference to the driving disc 12, may be varied in accordance with the character of the material to be fed in the form of wire, or the like, as well as the thickness of the wire and the quantity of heat which may be required for the particular work in hand.

The casing for the wire feeding mechanism may be secured by a series of screws 41 engaged through internal lugs 42 formed on the casing and held in position over the top of the motor casing in insulated relation thereto by means of suitable insulating sleeves 43, washers 44 and a gasket 45, the lower ends of said screws entering screw-threaded apertures in alignment therewith.

The upper portion of the casing carrying the idler wheel may be lifted bodily upward about a hinge 46 provided on the forward wall of the casing and is held in operative position through the snap spring 47 which may be formed integrally with the spring support 21. The snap spring engages a projection 48 on a rearward wall of the casing. The forward wall of the casing is formed with an enlargement adapted to provide a passageway 51 for the air or other gas used to project the fused material from the nozzle and preferably is provided with a nipple 52, screw-threadedly engaged in a socket below said passageway to receive the air hose. The wire is preferably received at its forward end in a sleeve 53 formed of porcelain or other insulating material having a central aperture slightly larger than the size of the wire, said sleeve being mounted at its rearward end in a pair of clamping discs 54, 55, centrally apertured and compressing a disc 56 of compressible gasket material intermediate the same to form an airtight joint. The insulating sleeve 53 is received within a tubular member 57 preferably of carbon forming the other electrode of the circuit, said sleeve preferably extending in a forward direction, and being positioned so as not to extend to the extreme end of the electrode, thus permitting the flexing of the wire to initiate the arc and also establishing a substantially uniform distance between the electrodes once the arc is initiated. The electrode 57 as is clearly shown in Figure 2, is formed with a large number of small air passageways 58 extending longitudinally thereof so that a large amount of air or gas may be carried to a point externally distributed about the arc. The electrode is supported in a collar 59 screw-threadedly engaged in a recess formed in the front wall of the casing concentrically with the position of the wire and is firmly clamped in air-tight relation to the casing by means of an insulating disc 61 engaged about the electrode 57 within the collar 59 which is provided with a recess containing a compressible member 62 beneath a portion of which an annular insulating member 63 is provided, said member being engaged within the rearward opening of the collar and bearing against the front wall of the casing. An external sleeve 64 is also screw-threadedly secured to the collar, said sleeve being in spaced relation to the electrode and having a plurality of ventilating apertures 65 therethrough. Said sleeve is provided, preferably on its under side, with an opening to receive a current conducting member 66 insulated from the sleeve by means of a bushing 67, said conductor member being connected with a ring 68 frictionally engaged over said electrode and completing the circuit therethrough. A suitable terminal 69 is provided on the end of the member 66 for attaching a flexible conductor. At the forward upper end of the cylindrical sleeve 64 an arc initiating arm 71 is provided, said arm being carried on a shaft 72 journaled in a pair of brackets 73 secured to the upper forward end of the sleeve and having a handle 74 at the outer end of the shaft for swinging the arm downwardly into contact with the wire 27. The arm has a Y-shaped terminal 75 which rides against the wire and deflects it a sufficient degree to initiate the arc through contact of the wire with the electrode, after which the release of the operating member will permit the arm to be swung upwardly through the action of a coiled spring 76 engaged about the shaft and having one end secured thereto and its opposite end secured to the supporting bracket.

The modified form of apparatus shown in Figure 5 discloses substantially the same feeding mechanism as that heretofore described, but the wire instead of being fed through the hollow electrode is fed preferably at a right angle thereto through a fixed sleeve 81. The hollow electrode 82 is engaged through an aperture in an extension 83 on the casing 84 and is held in clamped relation thereto by means of a collar 85 compressing an annular compressible disc 86 thereon. An enclosing tube 87 for the rearward portion of the electrode is screw-threadedly engaged in said extension 83 and an enclosing tube 88 for the forward end of the electrode is engaged on an annular flange on the extension 83 extending about the electrode. The rearward end of the electrode is provided with a reducing coupling 91 within the smaller end of which is engaged an air line 92 to a source of compressed air supply so that a projecting air jet of adequate volume may be carried through the central aperture 93 of the electrode to a point adjacent the point of formation of the arc. The motor for driving the apparatus shown in Figure 5 may correspond to that illustrated in Figure 1, or the motor 94 may be connected by means of a flexible shaft 95 with a shaft 96 carrying the driving worm for the first reducing worm wheel, as is shown in Figure 6.

The air or gas which is brought in through the hollow electrode passes alongside of the arc and in very close proximity thereto, but does not intersect the arc. This close positioning of the jet to the arc is desirable in order that fused material may be entrained in the jet and carried to the surface to be coated without disrupting the arc.

In both of the types of construction already described, either direct or alternating current may be used, but the direct current arc is preferable for the reason that the wire to be fused may be made the anode and thus receive the benefit of the high heat generated at the anode and also reduce the wearing away of the hollow electrode which would be the cathode. The use of direct current also has the advantage of continuity of the arc. It is known that the greatest wearing away occurs at the anode in direct current arcs, and this natural function of the arc is used to enhance the heating effect upon the wire.

Another type of spray gun is illustrated in Figure 7, wherein two wires are projected angularly toward each other or parallel to each other as may be desired, by means of separate drives actuated in this instance by a single prime mover driving a worm shaft 101. This shaft engages two worm wheels 102, 103, one connected with a friction drive for one of the wires 104 and the other connected with a friction drive for the other wire 105, and said friction drives having the regulating mechanism heretofore described in connection with the single wire feed. As is clearly shown in Figure 7, the drives for the separate wires are arranged so that the feed wheels operate in the same direction and make possible a very convenient disposition of the friction drive discs and the control means for the rate of speed.

Where wire of the same size and character is to be used in each of the paired or duplex nozzles shown in Figure 7, the rate of feed would be uniform and it would be possible to provide a pair of feed wheels on a single shaft, particularly where such nozzles were arranged in parallel relation. Where an angular arrangement is desired, as illustrated in Figure 7, the provisions of a single prime mover driving two friction discs set at an angle, permits the use of two angularly disposed feed wheels and this in turn permits independent control of speed. This latter feature therefore gives greater flexibility of control and where it is desired to spray material of different composition from each nozzle, it may be found that a high rate of feed would be necessary in one nozzle as compared with the other to produce the desired effect on the coated surface. It is pointed out in this connection that a twin nozzle spraying apparatus of this type is adapted for the laying of a preliminary coating on the surface directly in advance of the finishing coating and before the first coating has had an opportunity to become oxidized owing to the close succession in which the coatings are applied. The arrangement also would permit the mixture of the fused material in the jets and the deposition of an alloyed or mixed coating upon the surface to secure certain predetermined effects. For certain work divergent nozzles may be found desirable and the apparatus may be formed so as to permit any desired angular relation of the nozzles. Likewise any desired number of nozzles may be provided for special uses.

One form of device for initiating the arc is illustrated in Figure 8, wherein a plunger 106 having a Y-notch 107 at its lower end is normally held retracted out of the path of the jet by means of a spring 108 bearing against a bushing 109 engaged in the wall of the sleeve 111 about the nozzle and at its opposite end against the terminal knob 112 on the plunger so as to maintain the lower end against the inner face of said sleeve. The arc is initiated by pressing upon the terminal, causing the Y-shaped or notched lower end of the plunger to engage against the wire 113 and deflect it out of its normal axial position within the nozzle until it contacts with the adjacent electrode 114 surrounding the insulating guide tube 115 for the wire.

Suitable adjustment for the distance the electrode projects beyond the insulating sleeve for the wire may be provided, but for immediate adjustment to compensate for the burning away of the electrode, the sleeve 111 is supported telescopically over an inner sleeve 116, being held thereon by means of a set screw 117 or any other convenient securing means, whereby the outer sleeve may be moved toward the free end of the carbon electrode so as to bring the plunger into a suitable position to initiate the arc.

The electrode shown in Figure 8 corresponds with that shown in Figure 1 of the drawings, and the type of arc initiating plunger may be applied to an apparatus of the character shown in Figure 1 wherein a telescopic outer sleeve carrying the arc initiating device would be substituted for the oscillating arc initiating device shown in Figures 1 and 3.

Another form of nozzle is illustrated in Figure 9 wherein the air or other material projecting medium is carried to a point adjacent the arc within an annular space 118 intermediate the outer shell 119 and the electrode 121. In such case the electrode is not formed with a series of apertures through which the air or gas supply is projected, but is formed with only the central aperture 122 adapted to receive the insulating tube 123 carrying the wire 124. The electrode is supported within a sleeve 125 within the rearward portion of the nozzle shell and secured therein by any suitable means shown as a screw threaded engagement of a rearward flange on the sleeve with a screw threaded recess in the base of the nozzle shell, immediately in advance of a shallow member 126 at the base of the nozzle shell through which the air or other projecting medium utilized may be admitted to the annular space 118 between the shell and the electrode. The supporting sleeve for the electrode may be insulated therefrom by means of an inner sleeve of insulating material 127, the supporting sleeve being secured thereto by means of suitable set screws 128 intermediate the supporting and spacing flanges or projections on the supporting sleeve. The current is carried to the hollow electrode by means of a conducting element 129 engaged through an insulating bushing 131 secured in one side of the nozzle shell preferably at a central position, the terminal of said conductor being shown in the form of a band 132 encircling the electrode.

The base 133 of the nozzle shell may be externally screw threaded so as to be engaged within the screw threaded flange 134 formed on the outer face of the casing and it is obvious that other types and sizes of nozzles may be readily substituted on the apparatus by merely unscrewing the nozzle shell from the front of the casing and substituting the desired type of nozzle shell in lieu thereof.

The arc initiating device illustrated in Figure 9 comprises a lever 135 supported on a pivot 136 mounted centrally of the upper side of the nozzle having an operating button 137 adjacent its rearward end and having a depending link 138 at its forward end apertured adjacent its lower end to engage over the wire preliminary to the initiating of the arc. When the arc is desired the button is pressed downwardly and the wire will then be drawn upwardly into contact with the adjacent electrode and the fusing of the metal will take place at a point immediately within the outer end of the nozzle shell.

The outer end of the nozzle shell as clearly shown in Figure 9, overhangs the electrode to a slight extent and is tapered toward its free end so as to concentrate the air supply or other means utilized to project the material in the form of a gaseous cone enveloping the arc.

The overhanging of the outer end of the nozzle shell has the advantage of screening or shielding the arc from the eyes of the operator so as to make unnecessary the use of a welding hood or protective glasses over the eyes of the operator to prevent injury to the eyes from the ultra-violet rays of the arc. It also has the effect of providing a large quantity of rapidly moving air or gas about the arc so that no undue heating effect will take place on the outer end of the nozzle shell.

The arc initiating link in the form shown in Figure 9 may be provided with a coiled spring around its pivot pin to throw the link upwardly out of the path of the spray material after the arc has been initiated or the link may be manually moved to an inoperative position. Likewise a telescopic mounting for the outer end of the nozzle shell may be employed similar to that shown in Figure 8.

When it is desired to fuse and spray material of a pulverized character, an apparatus of the character shown in Figures 10 to 14 inclusive may be employed. The apparatus shown in Figure 10 is particularly adapted for the fusing and spraying of pulverized material. In such devices two hollow electrodes 141, 142 are supported on a bracket 143 providing a transverse slideway 144 having a supporting base 145 secured to a suitable handle or other means of support by means of a nut engaged over a securing pin 146. The slideway is formed with overhanging lateral flanges within which the base supports 147 or standards are engaged, said supports having transverse apertures 148 screw threaded to receive an adjusting or spacing bar 149. The bar illustrated in Figures 10 and 11 is formed adjacent its respective ends with oppositely threaded portions and is provided at one end with a knurled head 151 secured thereto by means of a pin 152 so that the bar may be rotated in either direction. It is obvious that by turning the knurled head the standards may be moved away from or towards each other through the action of the reversely threaded portions of the shank of said bar without changing the angular setting of the electrodes.

The standards referred to are provided with sockets in their upper ends within which are received supporting pins 153 formed on the under sides of cup-shaped electrode-supporting members 154, and clamped by a thumb screw 150. Each of said members 154 is provided with an aperture centrally of its rearward face to receive a screw-threaded nipple 155 over which an air hose 156 may be engaged and at its forward end said cup-shaped member is internally screw-threaded about its margins to receive a pair of electrode clamping members 157, 158. Two such clamping members are shown, the inner of said members 158 being formed with a recess on its outer face to receive a compressible member 159, each of said clamping members being insulated from the electrode by means of a thin sleeve of insulating material. The electrodes preferably comprise carbon electrodes centrally perforated from end to end and the current is supplied to such electrodes by means of a conducting member 161 clamped about the intermediate portion thereof and placed in circuit with any suitable conductors.

Supported on the forward face of the slideway a permanent magnet 162 is shown, said magnet being adjustable longitudinally by means of a clamping screw 163 extending through a pair of spaced bracket arms 164 between which the magnet is supported. Thus the turning of the clamping screw will serve to clamp the rearward end of the magnet and hold the same in any desired position of adjustment with reference to the free ends of the electrodes and closely adjacent the point of the formation of the arc.

In place of a permanent magnet, an electromagnet may be provided at the point indicated, the magnet being energized if desired by shunting across the power supply to the electrodes. The purpose of the magnet is to provide a magnetic field which repels the arc across the two electrodes causing the same to assume a flame shape and come in contact with the material entrained in the streams emerging from the hollow electrodes. In this manner the stream does not pass through the path of the arc but may be parallel and in contact with it. The shape of the spray from the nozzle would be fan shaped and would be particularly adapted to spread the material fused in the arc over a large surface with a uniform coating.

In order to supply the powdered material to a point adjacent the arc, flexible conduits 156 such as sections of rubber hose are provided connecting the nipples 155 rearwardly of the electrodes with like nipples 164 on a T-headed connection 165 with the container 166 for the powdered material. This container preferably is cylindrical having a conical top merging with the T-outlet above referred to and within the container is an inverted cylindrical receptacle 167 which may be designated a stand pipe and which is adapted to feed pulverized material from its lower end to an open space 168 beneath the same. The base of the container 166 is removable. A series of tangentially positioned air pressure connections 169 adjacent the base of the container are adapted to cause a centrifugal whirling action within the container creating a partial vacuum around the base of the standpipe, whereby material may be withdrawn from the base of the standpipe and passed in substantially uniform quantity as suspended particles in the jet to the hollow electrodes. The stream of powdered material is projected from the electrodes closely adjacent the arc which, as stated, is repelled outwardly by means of the magnetic field. As the particles enter the path of the arc they are fused and carried in such fused form against the surface to be coated. The air pressure is sufficient to carry the particles with a high degree of impact against the surface and the kinetic energy converted into heat by the force of impact, together with the heat of fusion serves to unite the particles in very close union with the surface of the article to be coated.

In Figure 14 there is shown another form of means for feeding the powdered material toward the path of an electric arc, such device having clamping and supporting means 171 similar to that shown in Figure 1, within which a hollow electrode 172 is frictionally secured, such electrode being energized through connection with one terminal of a circuit by means of a connecting ring 173 engaged over such electrode at an intermediate position. The electrode shown is formed with a series of longitudinal apertures 174 for the air jet similar to what is shown in Figure 1. Within the central aperture through the electrode an insulating sleeve 175 is provided and within such insulating sleeve there is telescopically engaged a tubular member 176 adapted to constitute the second electrode and to carry the powdered material 177 toward the position of the arc. The material is positively fed through the tube last referred to by means of a worm propelling device 178 located in a channelway positioned beneath the hopper 179 supplying the material and an electric motor 181 supplies means for driving such screw at the necessary speed. The tube carrying the powder projects slightly beyond the insulating sleeve 175, but stops short of the end of the outer electrode 172 and thus as the material, if a conductor of electricity, touches the walls of the electrode beyond said sleeve an arc is struck and is maintained thereafter through the continuous feed of the powdered material toward the position of the arc. If material is non-conductor, a suitable starting button similar to that shown in Figure 8 with Y-prong eliminated must be used to start the arc between the hollow conductor sleeves. In this manner a compact material fusing and spraying device is provided which is capable of using powdered material and in which the supply of material may be positively continued in the quantity required so that the arc may be continuously maintained.

Another form of construction is illustrated in Figure 15 wherein a wire electrode 182 is fed through an insulating sleeve 183 toward a fixed electrode 184 in the form of a carbon block having a central aperture 185 into which the wire may pass. An air supply nozzle 186 is positioned preferably at right angles to the position of the wire. Means similar to the devices heretofore described may be provided to deflect the wire sideways into the contact with the carbon electrode and thus initiate the arc. The air jet does not intersect the arc after it is initiated and the quantity of air delivered through such jet must be sufficient at all times to carry the molten material with sufficient velocity against the surface to be coated to insure close contact of the molten material with such surface and adherence to and penetration of the superficial area thereof. In the last-named device the electrode 184 is connected with one end of the electric circuit and the shaft 187 of the feed wheel 188 for the wire electrode is connected with the other end of the circuit.

Still another form of construction is illustrated in Figure 16, wherein two wire electrodes 191, 192, are shown as passing through suitable guide members 193, 194, and meeting at a point in front of the nozzle where an arc will be formed. One of the insulating tubes 193 extending through a nozzle supporting base 195 having a screw threaded ring 196 interengaged with the nozzle shell 197 which shell is tapered forwardly so as to closely approach the end of the central wire guide member 193. Between the supporting ring for the outer shell of the nozzle and the base 195 of the nozzle a chamber 198 is formed within which the air supply is received and distributed to the nozzle shell through a series of holes 199 formed through a partition member 201 at the base of the nozzle shell. The central insulating member is secured in position by means of a pair of discs 202, 203, engaged within the base member 195, one of said discs 202 being recessed to receive a compressible member 204 adapted to be forced into tight engagement with such tubular guide member 193. The other wire electrode 191 is shown with a slightly modified form of guide 194 and supporting member 205. The supporting member or base 205 is formed with a central aperture within which a screw threaded disc 206 is engaged, said disc being in turn apertured to provide a narrow passageway for the wire therethrough and having an enlarged recess on its lower face within which a compression plug 207 is received, said plug acting against a packing member 208 to form a fairly snug fit about the wire. The upper face of the base member is recessed to receive a supporting flange 209 screw-threadedly engaged therewith, said flange having a large central aperture adapted to receive an annular disc 211 through which the insulating sleeve 194 is engaged and held securely by means of a compressible annulus 212 received in the recess in the inner edge of the flange and seated against a disc 213 and adapted to be compressed by means of the disc 211 screw threadedly engaged within the flange 209. The conical outer shell 214 of the guide member is screw-threadedly engaged within the flange 209 and at its forward end extends to a position closely adjacent the hollow insulating sleeve just referred to. The insulating sleeve may be formed with a series of longitudinally extending air passageways 215 which would serve to admit the air from a chamber 216 within the base 205 and discharge the same around the path of the arc. Thus each of the wire electrodes will emerge angularly from its supporting device and will meet and contact at a position slightly in advance of the free ends of the supporting nozzles and about each of said wires a cone of air or like projecting fluid will be disposed with but a very small portion of such air intersecting the path of the arc.

It may be found that it would be desirable to combine some of the features of one type of apparatus illustrated with certain features from another type of apparatus and such combinations may be freely arranged for in accordance with the work to be accomplished by the apparatus.

The advantages of the several constructions above described have already been partly indicated but it should be emphasized that the chief advantage in using the electric arc in place of any other means of fusing the material to be sprayed consists in the almost unlimited degree of heat which can be obtained through the arc and the consequent wide variety of materials which can be fused and deposited in such fused form upon a surface to be coated.

The adherence of the particles projected from the point of fusion against the surface is very largely dependent upon the degree of heat originally applied to bring about the fusion of such particles inasmuch as the molecules of the material are disrupted by the intensity of the heat so that the material is in a somewhat free molecular condition when it impinges upon the surface to be coated and interknits with the irregularities of the surface into such close union that it cannot thereafter be disassociated along a plane of cleavage but is permanently connected with such surface.

The action just described permits handling of various types of non-rusting metals which when deposited upon sheet iron or the like produce a non-rusting article which may for example comprise a radiator shell made of sheet iron coated directly with stainless steel so closely interknit with the surface that it will withstand buffing and polishing until a very brilliant result is achieved.

Another use to which an apparatus of this character is adapted is the application of wear-resisting coatings to members formed of softer metals which may be employed to save weight or to reduce the cost of the apparatus in which they are used.

When powdered material is projected by the apparatus above described, it is possible to use various materials which when fused would become enamels which could thus be deposited directly upon the surface of articles to be enameled and provide a smooth and satisfactory enameled surface without requiring extended baking and heat treatment operations preliminary to the completion of such articles.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. An apparatus for fusing and spraying material having in combination a pair of supports, hollow electrodes engaged in said supports, means for spacing said supports to provide an arc, and means operating to feed pulverized fusible material through each of said hollow electrodes to said arc, said means being externally tangential to the positive column of said arc and projecting the material fused in said arc.

2. An apparatus for fusing and spraying material having in combination a pair of supports, hollow electrodes engaged in said supports, means for spacing said electrodes to provide an arc, and means operating to feed pulverized fusible material through said hollow electrodes to said arc, said means being externally tangential to the positive column of said arc and projecting the material fused in said arc.

AULDEN D. SNYDER.
ALBERT F. MAIER.